(12) United States Patent
Smith

(10) Patent No.: US 8,925,488 B2
(45) Date of Patent: Jan. 6, 2015

(54) SYSTEMS AND METHODS FOR THE CONTROLLED ELECTRIFIED FIELD BARRIERS

(75) Inventor: Jeffery Smith, Vancouver, WA (US)

(73) Assignee: Smith-Root, Inc., Vancouver, WA (US)

( * ) Notice: Subject to any disclaimer, the term of this patent is extended or adjusted under 35 U.S.C. 154(b) by 446 days.

(21) Appl. No.: 12/770,538

(22) Filed: Apr. 29, 2010

(65) Prior Publication Data

US 2010/0288203 A1 Nov. 18, 2010

Related U.S. Application Data

(60) Provisional application No. 61/178,641, filed on May 15, 2009.

(51) Int. Cl.
*A01K 61/00* (2006.01)
*A01K 79/02* (2006.01)
*E02B 1/00* (2006.01)

(52) U.S. Cl.
CPC .............. *A01K 79/02* (2013.01); *E02B 1/006* (2013.01)
USPC ............................................ 119/220

(58) Field of Classification Search
CPC .................................................. A01K 79/02
USPC ....... 119/220; 340/852, 621; 405/81; 367/10, 367/95, 99, 124, 131
See application file for complete search history.

(56) References Cited

U.S. PATENT DOCUMENTS

| | | | | |
|---|---|---|---|---|
| 2,778,140 A | * | 1/1957 | Applegate et al. | 43/17.1 |
| 3,013,256 A | * | 12/1961 | Damast | 361/178 |
| 4,580,525 A | * | 4/1986 | Marzluf | 119/220 |
| 4,825,810 A | * | 5/1989 | Sharber | 119/220 |
| 4,862,427 A | * | 8/1989 | Almagor et al. | 367/101 |
| 4,982,384 A | * | 1/1991 | Pipkin et al. | 367/95 |
| 5,168,473 A | * | 12/1992 | Parra | 367/124 |
| 5,327,854 A | * | 7/1994 | Smith et al. | 119/220 |
| 5,445,111 A | * | 8/1995 | Smith | 119/220 |
| 5,460,123 A | * | 10/1995 | Kolz | 119/220 |

* cited by examiner

*Primary Examiner* — Rob Swiatek
*Assistant Examiner* — Ebony Evans
(74) *Attorney, Agent, or Firm* — J. Curtis Edmondson; Law Offices of J. Curtis Edmondson

(57) ABSTRACT

A system and method is described for a controlled electrified fish barrier that induces a potential field in a body of water with an electric field generator, a control system, and an object detection system, so that when the anode and cathode of the electric field generator are inserted in a body of water, and the object detection system detects an object, the object detection system electrically signals the control system; and in response the control system electrically adjusts the electric field generator.

6 Claims, 3 Drawing Sheets

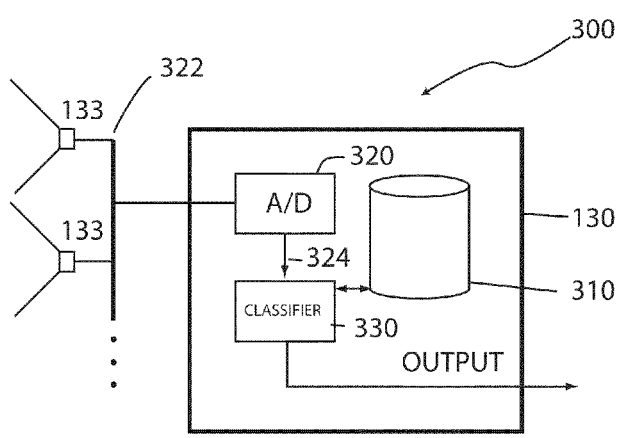
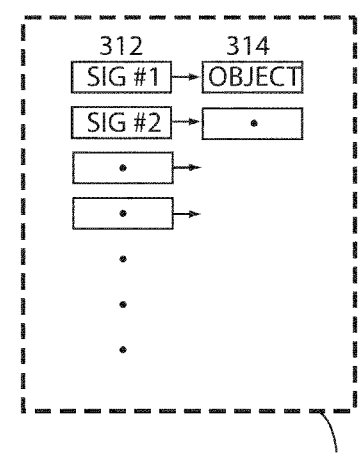
FIG.3a    FIG.3b
FIG.3

SYSTEMS AND METHODS FOR THE CONTROLLED ELECTRIFIED FIELD BARRIERS

RELATED APPLICATIONS

This application claims the benefit of U.S. Provisional Application No. 61/178,641; filed May 15, 2009, the contents herein incorporated into this application by reference.

BACKGROUND

The present inventive subject matter relates to the controlled electrification of fish barriers in general and the activation and control of barriers when certain objects are present in the water.

The effect of electric currents on fish are well known in the prior art and especially in the creation and implementation of electrified fish barriers. U.S. Pat. No. 5,445,111 (Aug. 29, 1995) to Smith (hereinafter "Smith patent"), which is incorporated herein in its entirety by reference, describes a system where electrodes are configured in a curtain array and/or a picket fence arrangement. As described in the Smith patent, the energized electric field in the water creates a electrical barrier that guides the fish to a desired area (typically a fish ladder) during the period of fish migrations. Electrical barriers are generally more effective at fish entrainment or deterrence, than alternate methods, such as mechanical barriers or by chemical poisoning.

Despite the inherent advantages of electrical fish barriers, there are certain situations in which the electrically generated field needs to be increased, decreased, or eliminated due to the presence of objects proximate to the barrier. For example, in certain situations, a vessel with a conductive hull may be present in the vicinity of the electrical fish barrier. The presence of a vessel will modify the electrical field requiring either an increase or a decrease in the potential difference to maintain the same electrical field. In other situations, there may be swimmers in the vicinity of the electrical field. In this situation the electrical field will also have to be modified to reduce any current effects on the swimmers.

Therefore, what is desired is an apparatus to detect and quantify objects located in the vicinity of an electrical barrier and modify the electrical barrier in response to the measured characteristics of that object.

SUMMARY

The present inventive subject matter overcomes problems in the prior art by having a controlled electrified fish barrier that induces a potential field in a body of water having an electric field generator, the electric field generator having an anode and cathode, and a control system, the control system electrically connected to the electric field generator; and an object detection system, the object detection system electrically connected to the control system; so that when the anode and cathode are inserted in a body of water, and the object detection system detects an object, the object detection system electrically signals the control system; and in response the control system electrically adjusts the electric field generator. The controlled electrified fish barrier also has an object detection system with an analog to digital (A/D) converter; a classifier, the classifier electrically connected to the Analog to Digital converter; a classifier-object database, the classifier-object database electrically connected to the classifier; and the classifier-object database further comprising: a data signature column and an output object column; so that when an analog electrical signal is received by the analog to digital converter and converted into a data signature, and the data signature is programmatically matched to produce an output object, such that the generated output object modifies the electric field barrier. The controlled electrified fish barrier also has an Analog to Digital Converter is a sonar system. The controlled electrified fish barrier of where the sonar system is a split-beam sonar. The controlled electrified fish barrier where the Analog to Digital Converter is a optical system. The controlled electrified fish barrier of where the Analog to Digital Converter is a wake detection system. The controlled electrified fish barrier where the control system has an electrical field that is adjustable. The controlled electrified fish barrier where the control system produces an electrical field in the water from 0.1 V/cm to 10 V/cm.

A method for controlling an electrical field in a body of water having the steps of, obtaining an electric field generator, wherein the electric field generator has an anode and a cathode, immersing the anode and cathode in a body of water, connecting a control system to the electric field generator, the control system capable of modifying the electric field generator; connecting an object detection system to the control system, the object detection system electrically connected to the control system, detecting an object in the body of water; and, adjusting the electrical field by the control system in response to the object. These and other embodiments are described in more detail in the following detailed descriptions and the figures.

The foregoing is not intended to be an exhaustive list of embodiments and features of the present inventive subject matter. Persons skilled in the art are capable of appreciating other embodiments and features from the following detailed description in conjunction with the drawings.

BRIEF DESCRIPTION OF THE DRAWINGS

FIG. 3 is a functional block diagram of the object detection system.

LIST OF REFERENCE CHARACTERS

110—Electric Field Generator
112—Anode
114—Cathode
120—River
122—Downstream Water Flow
130—Object Detection System
133—Signal Detectors
136—Detection-Control Link
140—Control System
142—Control-Barrier Link
150—Boat
160—Person
170—Fish
200—Flowchart
210—Program is started
220—Initialized
230—Monitors
240—Detected
250—Adjusted
260—Object is not present
270—Reset
310—classifier-object database
320—A/D converter,
330—Classifier,

DETAILED DESCRIPTION

Figure 1:
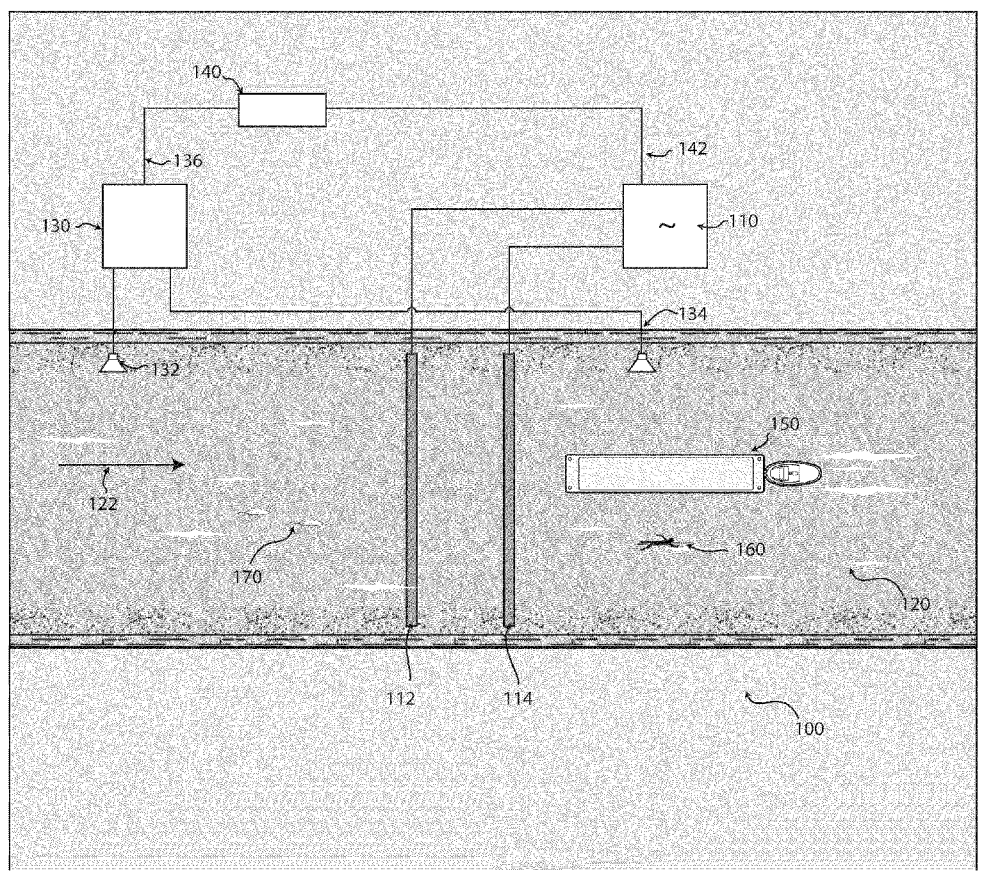
FIG. 1 is a top view of the barrier system
Figure 2:
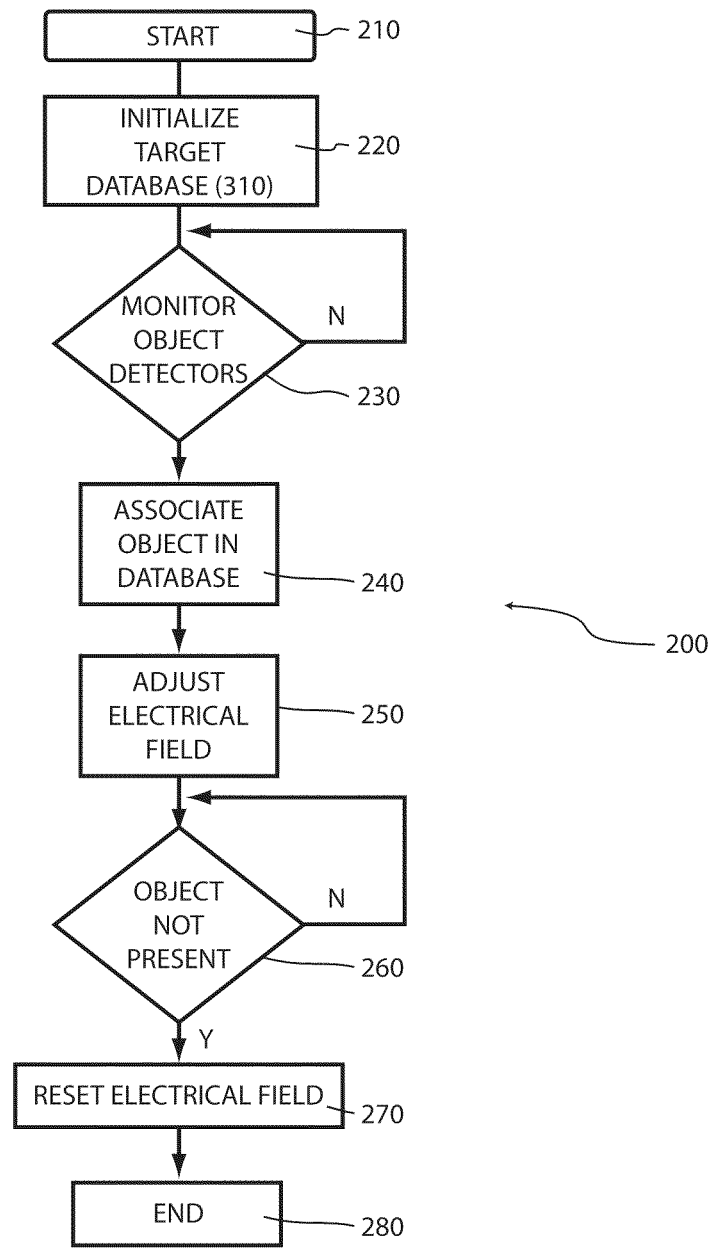
FIG. 2 is a flowchart of the operation of the barrier system.

Representative embodiments according to the inventive subject matter are shown in FIGS. 1-3 wherein similar features share common reference numerals.

The term "fish" generally refers to the should not be limited to only such fish, but can also include any animal in a body of water, such as, an ocean, stream, or lake, such as pinnipeds, crustaceans, and/or humans.

The term "river" is generally refers to a freshwater body of water that flows from land to the ocean, but the term can also include any flowing body of water, including, but not limited to, tidal zones, flows between estuaries, flows to tributaries, and oceanic water flows.

Now referring to FIG. 1, which illustrates the preferred embodiment of the inventive subject matter; a controllable electric field barrier system 100 (hereinafter "barrier system"). The barrier system 100 has an electric field generator 110, and anode 112, and the cathode 114. The anode 112 and the cathode 114 are immersed in water (e.g. the River 120 or Stream) and when the anode and cathode are electrified an electric field is formed between the anode 112 and the cathode 114. This electric field affects boats 150 and people 160 when they are in the proximity of the electric field. The electric field also has the effect of deterring fish 170 when an electric field is present.

The electric field generator 110 generates an electric field between the anode 112 and the cathode 114. The intensity of the electric field created by the electric field generator 110 is dependent on a number of environmental factors in the river 120. First, the field is dependent on the width of the river 120. Second, the field is dependent on the spacing between the anode 112 and the cathode 114. Third, the electric field is dependent on the conductivity of the water. For example, river water generally has a lower conductivity than sea water and as a consequence the electric field generator 110 in connection with sea water will require greater electrical power to produce the same voltage gradient than in river water.

As discussed, the size and capacity of the electric field generator 110 can be determined based on the configuration of the barrier. A typical barrier may be powered by a 1500 watt pulsator, such as the Smith Root™ BP-1.5-POW Pulsator. Larger barriers would require correspondingly larger power supplies and/or multiple units of the aforementioned pulsator (e.g. electrical generator). Electrodes may also be constructed from conductive materials, such as, steel, iron, rebar, or similar materials that have high conductivity and are durable in river water and/or sea water.

The operation of the electric field barrier system 100 involves three subsystems. An object detection system 130 having the subcomponents of object detectors 132, 134, and a Detection-Control Link 136. The object detectors 132, 134 are configured to detect an object in the water. The object detectors 132, 134 may utilize active sonar technology, passive sonar technology, visual technology (e.g. optical sensors), and/or splash sensors. The object detectors 132,134 produce electronic signatures that are digitized by the object detection system 130. During operation, the object detection system 130 outputs an electronic signature that corresponds to the object present in the water. A typical object may be a boat 150 or a person 160. The example of a boat 150 or a person 160 is for representative purposes only any equivalent object may have its own unique signature.

Now referring to the flowchart 200 of the control system for the barrier system as shown in FIG. 2, when the program is started 210 the programs and target database 310 (see FIG. 3) are initialized 220. The system then monitors 230 the water area for objects, such as a boat 150 and/or a person 160 that may fall into the river 120. When an object 150,160 is detected 240, the electrical field is adjusted 250. The adjustment 250 of the electrical field is performed by sending a signal to the barrier electrifier 110. This adjustment 250 of the electrical field occurs until the object is not present 260. When the object is not present the electrical field is reset 270 to its previous state.

The term "adjustment of the electrical field" may involve increasing and/or decreasing the electrical field relative to the normal settings of the electric field. For example, if the barrier is design to entrain fish, a electrical field setting of 1 V/cm may be the setting for the normal operational characteristics of the field. Alternately, to deter pinnipeds an electrical field setting of 0.1 V/cm may be the setting for the normal operational characteristics of the field.

Now referring to FIG. 3 which illustrates the object detection system 130. The components of the object detection system 130 is an A/D converter 320, a classifier 330, and the detection-control link 136. The classifier 330 is connected to the classifier-object database 310. The A/D converter 320 is connected to signal detectors 133.

The A/D converter 320 converts signals using devices that are well known in the arts. For example, a sonar signal will output an A/D signature that is characteristic of an echo. Representative systems that can monitor and characterize the sonar signal consist of the SciFish 2100 (Attached as Appendix A).

Other detection systems would generate A/D signals would have different characteristics. For example, a "splash detector" would sense that an object fell in the water. The perturbation of the water surface would have a characteristic that could be classified and recognized. These detection systems may consist of simple level detectors that are positioned on the edge of the water surface (e.g. to measure the "ripple" created by the water when an object impacts the surface.). Alternately, the system may consist of optical detectors that measure a change in the reflection of the surface as a consequence of an object being in the water.

The classification of A/D signals is dependent on the creation of a signature database. Now referring to FIG. 3A which depicts some of the functional elements of this database. A list of data signatures 312 is stored in a row with a corresponding list of output objects 314. When a data signature 312 is pattern matched against the output object 314. The output object 314 consists of an electrical profile consistent with the type of action to be taken based on the data signature 312.

For example, if the data signature 312 indicates that a person is in the body of water proximate to the anode 112 and the cathode 114, then the output object 314 may be set to reduce the electrical field from operational strength to a minimal field. Alternately, a conductive ship may be passing between the anode 112 and cathode 114 which would require the output object 314 to modify the electrical profile to maintain the same electrical field strength in the water.

Another example involving the data signatures 312 for individuals species of fish that are in the water and are proximate to the anode 112 and the cathode 114. These signatures may represent migratory fish, young-of-year (YOY), invasive species, or other aquatic animals. The output object 314 will modify the electrical profile to adjust the electrical field strength in the water in response to the particular type of fish.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

The invention claimed is:

1. A method for controlling an electrical field in a body of water comprising the steps of:
    defining a vicinity within the body of water;
    initializing a target database having data signatures for a first object or a first set of objects;
    generating within the vicinity the electrical field between at least one anode and at least one cathode under the water;
    adjusting the electrical field based on the data signatures of the first object or the first set of objects within the vicinity;
    detecting a second object or a second set of objects in the vicinity, the second object or the second set of objects initially distanced outside the vicinity in the adjusting step, then the second object or the second set of objects swim in to, reposition within, or fall overboard within the vicinity, wherein the detecting step further comprises utilizing sonar, optical sensors, and wake detection sensors;
    readjusting the electric field in response to the adjusting and detecting steps;
    repeating the adjusting, detecting and readjusting steps to entrain, control, and direct the first object or first set of objects; and,
    repeating the adjusting, detecting and readjusting steps to repel and avoid the second object or second set of objects while maintaining operation of the electrical field that is based on the data signatures of the first object or the first set of objects within the vicinity;
    wherein the electrical field in the body of water ranges from about 0.1 V/cm to about 10 V/cm.

2. The method of claim 1, wherein the adjusting step is based on environmental factors with at least one environmental factor chosen from a size of the vicinity, a distance between the at least one anode and the at least one cathode, or a conductivity of the water.

3. The method of claim 2, wherein the adjusting step is based on the first object or the first set of objects being under the water and on a surface of the water within the vicinity.

4. The method of claim 1, wherein during the detection step, the electrical field is reset to a previous state.

5. The method of claim 1, wherein an operational strength of the electrical field is increased and decreased, during the adjusting step.

6. The method of claim 1, wherein the second object or second set of objects are inorganic.

* * * * *